United States Patent Office 3,696,075
Patented Oct. 3, 1972

3,696,075
LACTAM POLYMERIZATION WITH DIACYL METHANE INITIATORS
Markus Matzner, Edison, and James E. McGrath, Somerville, N.J., and Robert M. Manyik, St. Albans, and Wellington E. Walker, Charleston, W. Va., assignors to Union Carbide Corporation, New York, N.Y.
No Drawing. Filed Apr. 29, 1970, Ser. No. 33,077
Int. Cl. C08g 20/18
U.S. Cl. 260—78 L                5 Claims

ABSTRACT OF THE DISCLOSURE

Substituted diacyl methanes are utilized as polymerization initiators or activators with alkaline catalysts in the anionic polymerization of lactam monomers so as to provide for a rapid polymerization process with an initiator having a low order of toxicity.

BACKGROUND OF THE INVENTION

(1) Field of the invention

The invention relates to the anionic polymerization of lactam monomers.

(2) Description of the prior art

In the anionic polymerization of lactams there is usually employed a catalyst-initiator system. The catalyst is commonly a material which will form an alkali or alkaline earth metal salt of the lactam. The initiators or activators that have been used to date have included a number of materials. Although some of these materials when used as initiators, such as the isocyanate materials, provide for a relatively fast polymerization reaction, they are also relatively toxic materials. The toxicity of these materials presents a health hazard both during the polymerization of the lactam monomers as well as during the use of the polymeric materials which may be obtained from such polymerizations. With respect to the latter type problem, for example, where the lactam polymers are to be used for food or drug contact purposes residual amounts of toxic initiators in the polymers may curtail the use of the polymeric material in such applications.

The use of a relatively fast catalyst-initiator polymerization system is important, moreover, in present day molding equipment that might be employed on high speed production lines wherein the polymerization reaction is conducted in situ, which polymerization technique is commonly employed today in the commercial molding of anionically produced lactam polymers.

SUMMARY OF THE INVENTION

Lactams are anionically polymerized utilizing a catalyst-initiator system whereby the lactams may be readily polymerized in a relatively short period of time with a relatively non-toxic initiator. This polymerization system contains an anionic catalyst and, as the initiator or activator, one or more substituted diacyl methane compounds.

An object of the present invention is to provide an anionic polymerization process whereby lactams may be readily polymerized in a relatively fast period of time to provide high molecular weight polymers with a relatively non-toxic initiator.

Another object of the present invention is to provide a novel initiator or activator system for use in the anionic polymerization of lactam monomers.

DESCRIPTION OF THE PREFERRED EMBODIMENT

It has now been found that lactams may be polymerized anionically in a relatively fast period of time with a relatively non-toxic initiator if there is employed as the catalyst-initiator system for such polymerization an anionic catalyst and, as an initiator or activator, one or more substituted diacyl methane compounds.

The lactams

The lactams which may be polymerized according to the present invention are all those which are capable of being polymerized anionically and are preferably those lactam monomers which contain at least one ring group of the structure

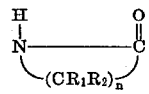

wherein $n$ is a whole number which is 3 to 15, and preferably 3 to 10, and $R_1$ and $R_2$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexdecanolactam, alkyl substituted caprolactams, aryl substituted lactams, and the like.

Lactams having a plurality of ring structures which may be used in the present invention include bis-lactams such as alkylene bis-lactams of the formula:

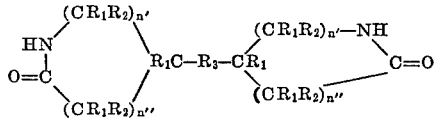

wherein $n'$ and $n''$ are each whole numbers such that $n'$ and $n''$ is 2 to 14; $R_1$ and $R_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

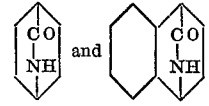

The lactams to be polymerized can be used individually or in any combination thereof.

The initiator

The diacyl methane initiators which may be used in the process of the present invention have the structure

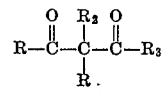

wherein R and $R_3$ are the same or different $C_1$ to about $C_{20}$, inclusive, saturated or unsaturated, substituted or unsubstituted, carbon containing radicals which may be (a) hydrocarbon radicals including aliphatic, alicyclic and aromatic radicals such as methyl, ethyl, propyl, butyl, cycloheptyl, cyclohexyl, ally, propenyl, hexadienyl, octadienyl, phenyl, benzyl and naphthyl, and/or (b) radicals containing O, S and/or N in the carbon chain such as pyridyl, quinolyl, thiazolyl, oxazoylyl, oxadiazyl, pyrazyl, and imidazyl; and Where R and $R_3$ are substituted, they may contain substituents which are inert to the other components of the polymerization reaction system, such as halogen, i.e., Cl, Br, F, and I; NO, CN and $C_1$ to $C_{10}$, inclusive, acyl radicals;

$R_1$ and $R_2$ may be the same or different radicals, and may be H, R, $R_3$, RCO, $R_3$CO, RNHCO and/or $R_3$NHCO, with the proviso that no more than one of $R_1$ and $R_2$ is H.

The preferred initiators are those in which $R=R_3$ and $R_1=R_2=C_3$ to about $C_{10}$, inclusive, unsaturated acyclic hydrocarbon radicals.

Examples of the initiators are 3,3-di(2',7'-octadienyl)acetyl acetone,
3,3-diallyl acetyl acetone,
4,4-di(2',7'-octadienyl)-3,5-hexanedione,
4-(2',7'-octadienyl)-4-allyl-3,5-hexanedione,
4,4-di(2',7'-octadienyl)-3,5-heptanedione,
1,5-diphenyl-3,3-di(2',5'-hexadienyl)-2,4-pentanedione,
1,5-di-(α-nahthl)-3-(2',5'-hexadienyl)-3-(2″,7″-octadienyl)-2,4-pentanedione,
2,6-di(3-pyridyl)-4,4-di(2',7'-octadienyl)-3,5-hexanedione,
2,6-di(3-oxazolyl)-4,4'-di(2',7'-octadienyl)-3,5-hexanedione and
1,5-di-(3-thazolyl)-3-(2',5'-hexadienyl)-3-(2″,7″-octadienyl)-2,4-pentanedione.

The initiators may be prepared as disclosed by Adkins, Kutz and Coffman, J. Amer. Chem. Soc., volume 52, page 3218, 1930; by C. Hata, et al. at page 1836 of Chemistry and Industry, Dec. 20, 1969; and in U.S. Pat. application Ser. No. 33,064 filed Apr. 29, 1970 in the names of W. E. Walker and R. M. Manylk and entitled "Telomerization of Dienees With Activated Carbon-Hydrogen Bonds." This patent application discloses that 1,3-conjugated diolefins, such as butadiene, react with compounds containing an activated carbon-hydrogen bond, activated by electron withdrawing groups, such as ethyl acetoacetate, in the presence of palladium or platinum catalysts to yield compounds which may be used as initiators in the present invention.

The compounds containing activated carbon-hydrogen bonds which can participate in this reaction are represented by the general formula

where X and Y are electron withdrawing groups selected from the groups nitro, nitrite, cyano, carboxy, hydrocarbyl carboxylate, hydrocarbyl carbonyl, carboxaldehyde, carboxyloxy, nitroso, phenyl, trihydrocarbylammonium cation, substituted phenyl, and halogen, such as chlorine, fluorine, and bromine. Z can be an electron withdrawing group selected from the above or it can be a hydrogen, an alkyl, or an alkenyl group, such as methyl, ethyl, isopropyl, cyclohexyl, t-bnutyl, allyl, butenyl octadienyl cyclohexeneyl, bicycloheptenyl and the like. The following are some examples of those compounds which are useful in this reaction. Such compounds are 2,4-pentanedione (acetyacetone), ethyl acetoacetate, diethylmalonate, malononitrile, phenylacetonitrile, ethyl cyanoacetate, ethyl phenylacetate, dinitromethane, p-tolylacetonitrile, p-nitrophenylacetonitrile, p-chlorophenylacetonitrile, p-bromophenylacetonitrile, p-methoxy-phenylacetonitrile, p-dimethylaminophenylacetonitrile as well as the corresponding meta and ortho derivatives, phenyl-2-propanone (phenylacetone), p-methoxyphenyl-2-propanone, p-nitrophenyl-2-propanone, p-chlorophenyl-2-propanone, p-toly-2-propanone, p-dimethylamino-2-propanone as well as the corresponding meta and ortho derivatives, 1,3-diphenyl-1,3-propanedione,
phenylnitromethane,
bis(p-nitrophenyl)methane,
3-methyl-2,4-pentanedione,
3-ethyl-2,4-pentanedione,
3-isopropyl-2,4-pentanedione,
3-phenyl-2,4-pentanedione,
3-cyclohexyl-2,4-pentanedione,
3-allyl-2,4-pentadione,
3-(octa-2,7-dien-1-yl)-2,4-pentanedione,
3-(octa-1,7-dien-3-yl)-2,4-pentandedione,
3-(2,7-dimethyl octa-2,7-dien-1-yl)-2,4-pentanedione,
3-butenyl-2,4-pentadione,
2-methylmalonitrile,
2-ethylmalono-nitrile,
2-isopropylmalonitrile,
2-phenylmalonitrile,
2-allylmalonitrile,
2-butenylmalonitrile,
2-octa-2,7-dien-1-ylmalonitrile,
2-octa-1,7-dien-3-ylmalonitrile,
ethyl-2-methyl acetoacetate,
ethyl-2-ethylacetoacetate,
ethyl 2-ally-acetoacetate,
ethyl 2-butenyl acetoacetate,
ethyl 2-(octa-2,7-dien-1-yl)acetoacetate,
ethyl 2-(2,7-dimethyl octa-2,7-dien-1-yl)acetoacetate,
triacetylmethane,
1,3-indandione, and the like.

Instead of butadiene, other 1,3-dienes may be employed to form the initiator compounds. Examples of such suitable dienes are isoprene, piperylene, 1,3-hexadiene, 2,4-hexadiene, 2,3-dimethylbutadiene, chloroprene, methoxybutadiene and similar compounds.

When this process is conducted as a homogeneous liquid phase reaction, the active catalyst species can be derived from a palladium compound which is soluble in the reaction mixture or which can be made soluble therein by reaction with one of the components of the said mixture.

Illustrative palladium compounds which may be used are various palladium compounds, such as: palladium (II) acetylacetonate, palladium-olefin complexes, such as 1,5-cyclooctadiene palladium (II) chloride, π-allyl-palladium acetate, endo-dicyclopentadiene palladium (II) bromide and the like; complexes of palladium with trihydrocarbylphosphines and arsines, e.g., bis(triphenylphosphine)palladium (II) acetate, bis(tri-p-methoxyphenylphosphine) palladium (II) acetate, bis(triphenylarsine) palladium (II) chloride; and the like; palladium (II) alkanoates, e.g., palladium (II) acetate, palladium (II) butyrate, palladium (II) hexanoate and the like; as well as other palladium compounds, such as palladium (II) bromide, palladium (II) chloride, palladium (II) nitrate, palladium (II) sulfate, ammonium chloropalladite, potassium chloropalladite, potassium chloropalladite, sodium chloropalladite and the like. Analogous compounds of platinum are well known and are also effective as catalysts in this process.

While any one of the palladium or platinum compounds previously described can be used as catalysts, improved results can be obtained by the addition of certain ligands as catalyst modifiers, in the cases of compounds which do not contain such ligands. These ligands or modifiers can be reacted with the metal-containing compound in a separate reaction and added to the reaction mixture of the diene with active hydrogen compounds or it can be added directly to the reactant mixture to yield an active catalyst species in situ.

The modifiers can be selected from the trihydrocarbyl phosphines, such as the trialkyl phosphines, e.g., tri-n-octyl-phosphine, tributylphosphine, dimethyl-n-octylphosphine, and tricyclohexylphosphine and the triarylphosphines, e.g., triphenylphosphine, tritolylphosphine, diphenyl p-chlorophenylphosphine and tris(p-methoxyphenyl) phosphine.

These modifiers may be added to the reaction mixture in quantities such that the ratio of the total number of moles of modifiers of all kinds (whether added as components of the palladium or platinum catalyst or added separately) to palladium or platinum can vary, for example, from 200:1 and higher and 1:10 and lower, preferably from 50:1 to 0.2:1, most preferably from 20:1 to 1:1.

The process of reacting the diene with the compounds containing the activated carbon-hydrogen bonds is conducted in the presence or absence of solvent. In the modification where solvents are employed, solvents that are suitable are those that are capable of dissolving the reactants, catalyst and catalyst modifier, and are inert to the reactants and products prepared under the stated conditions of the reaction. A solvent would be considered inert if it did not cause significant byproducts to accompany the formation of product. Exemplary solvents include dialkylethers, such as diethyl ether, dibutyl ether and methyl hexyl ether; alkylaryl ethers, such as anisole and phenylbutyl ether; and cyclic ethers, such as tetrahydrofuran, dioxane and dioxolane.

The platinum or palladium catalyst is employed in catalytically significant quantities. A catalyst concentration in the range from about 0.000001 molar and lower to about one molar and higher is suitable. A catalyst concentration in the range from about 0.0001 to about 0.1 molar is preferred. The reaction can be conducted with the catalyst absorbed on a solid support, e.g., silica, alumina, silica-alumina, asbestos, activated carbon and the like. The amount of catalyst on the support can be varied over a wide range, e.g., 0.001 to 10 weight percent of the catalyst based on the weight of the catalyst and support.

The ratio of the diene to the compound containing an active carbon-hydrogen bond can vary widely in the reaction and is not a critical part of this invention. Generally, the ratio of diene:active C—H compound can range from 200:1 to 0.01 to 1 with 20:1 to 0.1:1 being preferred.

The reaction can be carried out by charging the catalyst, the solvent (if desired), and the active carbon-hydrogen compound to a pressure vessel and introducing the diene to the vessel. The reaction can be carried out at temperatures of —5° C. to 200° C. Preferred reaction temperatures are 20° C. to 180° C., most desirably from 40° C. to 130° C. The reaction can be carried out at autogenous pressures, or higher if desired as well as at atmospheric pressure or below if it presents any advantages. After the reaction, the organic products may be recovered by any technique known to those skilled in the art and the catalyst recycled for future use.

The initiators of the present invention may be used individually, or in combination with each other, or with other initiators. About 0.1 to 5 mole percent of initiator is used based on the moles of lactam monomer being polymerized.

The polymers

The use of the initiators of the present invention results in the preparation of polymers by the following process wherein there is used as the initiator one as described above wherein $R=R_3$;

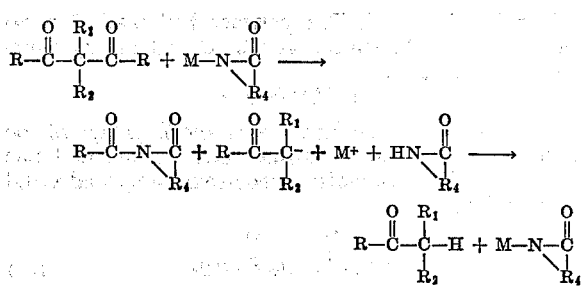

This step ↑ regenerates the anion, and then

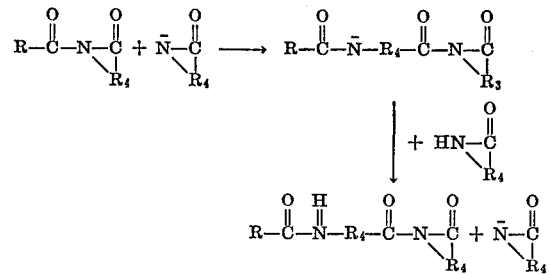

and thus the anion is again regenerated.

This process is repeated in the polymerization system to provide a polymer having the structure

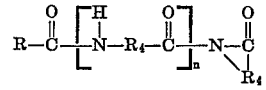

Wherein $R_4$ is that portion of the structure of the lactam being polymerized which lies between the nitrogen atom and the carbonyl carbon atom of such lactam, and $n$ is a whole number $>1$ and is such that the polymer is a material that is normally solid, i.e., solid at temperatures of about 25° C., and has a reduced viscosity in m-cresol (0.1 gram/100 ml.) at 25° C. of ≤0.4, and preferably about 0.8 to 7, deciliters/gram.

The value of $n$ may vary somewhat in each polymerized lactam chain, and will be about 10 to about 5000. The polymers would thus have molecular weights of about 1000 to 500,000 or more.

The lactam polymers prepared with the initiators of the present invention have good color and physical properties.

The catalyst

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites, Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

The polymerization process

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100 to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C. depending on the lactam(s) employed, and the polymerization temperature. The bulk polymerization reaction should be carried out under anhydrous conditions, i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. 3,061,592 and 3,383,352, and by G. B. Gechele and G. F. Martins in J. Applied Polymer Science 9, 2939 (1965).

Adjuvants

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to the employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for the intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

EXAMPLE 1

To a dry Pyrex test tube was added 113 grams (1.0 mole) of ε-caprolactam. The temperature was raised to 100° C. and 0.24 grams ($10^{-2}$ mole, 1 mole percent) of sodium hydride was added. After about five minutes the sodium ε-caprolactam in ε-caprolactam solution had formed. The temperature was then raised to 160° C. and 3.2 grams ($10^{-2}$ mole, 1 mole percent) of 3,3-di(2',7'-octadienyl) acetyl acetone(I)

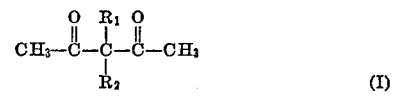

(I)

where $R_1=R_2=$octadienyl was rejected into the system. After two minutes a solid polymer had formed and crystallization began. The hard, tough polymer was removed from the bath after twelve minutes.

EXAMPLE 2

The procedure of Example 1 was repeated with the initiator being 3,3-diallyl acetyl acetone(II).

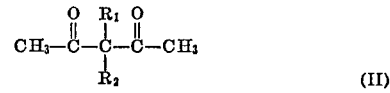

(II)

where $R_1=R_2=$allyl. The polymer had reached a no flow stage after 2.5 minutes at 160° C. and was crystallizing after 5 minutes.

EXAMPLE 3

To demonstrate the influence of the R groups of the initiator on the rate of polymerization, Example 1 was repeated with, as the initiator, the parent compound acetyl acetone(III)

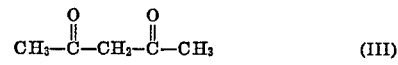

(III)

The polymerization required five hours to reach a no flow stage at 160° C. This, of course, is a completely impractical rate of polymerization for commercial purposes.

What is claimed is:

1. A process for preparing a moldable polymer which comprises anionically polymerizing a lactam monomer with an anionic lactam polymerization catalyst and an anionic lactam polymerization initiator which comprises using as said catalyst a lactamate salt selected from the group consisting of lactamate salts of alkali and alkaline earth metals, and of the hydroxides, oxides, alkoxides, phenoxides hydrides, alkyls, aryls, amides, and borohydrides of such metals and using as said initiator at least one diacyl methane compound which has the structure

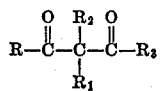

wherein R and $R_3$ are the same or different radicals and are selected from the group consisting of methyl, ethyl, propyl, butyl, cycloheptyl, cyclohexyl, allyl, propenyl, hexadienyl, octadienyl, phenyl, benzyl, and naphthyl radicals, and $R_1$ and $R_2$ are the same radicals and are selected from the group consisting of methyl, ethyl, propyl, butyl, cycloheptyl, cyclohexyl, allyl, propenyl, hexadienyl, octadienyl, phenyl, benzyl, and naphthyl radicals.

2. A process as in claim 1 in which R and $R_3$ are $CH_3$ and $R_1$ and $R_2$ are the same and are selected from the groups consisting of allyl, propenyl, hexadienyl and octadienyl radicals.

3. A process as in claim 2 in which said lactam monomer comprises ε-caprolactam.

4. A process as in claim 3 in which said initiator comprises 3,3-di(2′,7′-octadienyl)acetyl acetone.

5. A process as in claim 3 in which the initiator comprises 3,3-diallyl acetyl acetone.

References Cited

UNITED STATES PATENTS 3,206,418    9/1965    Giberson _____ 260—78 L X
3,489,726    1/1970    Bukac et al. _____ 260—78 L WILLIAM H. SHORT, Primary Examiner L. M. PHYNES, Assistant Examiner U.S. Cl. X.R.

260—78 P

UNITED STATES PATENT OFFICE
CERTIFICATE OF CORRECTION

Patent No. 3,696,075                    Dated October 3, 1972

Inventor(s) M. Matzner, J.E. McGrath, R.M. Manyik & N.E. Walker

It is certified that error appears in the above-identified patent and that said Letters Patent are hereby corrected as shown below:

Column 3, line 56, "t-buutyl" should read --t-butyl--, and a comma should be inserted after "butenyl".

Column 3, line 57, a comma should be inserted after "dienyl".

Column 6, lines 1-4 the structure on the right hand side of the equation should read

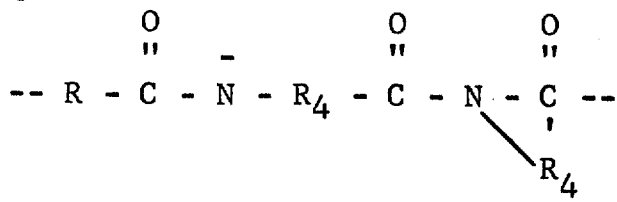

Column 6, line 26, " $\leq 0.4$ " should read -- $\geq 0.4$ --.

Column 9, line 10, a comma should be inserted after "phenoxides".

Signed and sealed this 24th day of April 1973.

(SEAL)
Attest:

EDWARD M. FLETCHER, JR.
Attesting Officer

ROBERT GOTTSCHALK
Commissioner of Patents